United States Patent [19]

Henseler

[11] Patent Number: 5,018,761
[45] Date of Patent: May 28, 1991

[54] SAFETY DEVICE IN THE FORM OF AN AIRBAG FOR MOTOR VEHICLES

[75] Inventor: Wolfgang Henseler, Tübingen, Fed. Rep. of Germany

[73] Assignee: Daimler-Benz AG, Fed. Rep. of Germany

[21] Appl. No.: 524,572

[22] Filed: May 17, 1990

[30] Foreign Application Priority Data

May 17, 1989 [DE] Fed. Rep. of Germany ....... 3916011

[51] Int. Cl.$^5$ .............................................. B60R 21/22
[52] U.S. Cl. ................................... 280/730; 280/732; 280/739; 280/743
[58] Field of Search ............... 280/730, 732, 739, 742, 280/743

[56] References Cited

U.S. PATENT DOCUMENTS

| | | | |
|---|---|---|---|
| 3,795,414 | 3/1974 | Ventre et al. | 280/730 |
| 3,831,972 | 8/1974 | Allgaier et al. | 280/730 |
| 3,887,213 | 6/1975 | Goetz | 280/739 |
| 3,937,488 | 2/1976 | Wilson et al. | 280/743 |
| 4,963,412 | 10/1990 | Kokeguchi | 280/743 |

FOREIGN PATENT DOCUMENTS

| | | |
|---|---|---|
| 2122704 | 11/1971 | Fed. Rep. of Germany . |
| 1780304 | 4/1972 | Fed. Rep. of Germany . |
| 3505927 | 8/1986 | Fed. Rep. of Germany . |
| 3644554 | 4/1988 | Fed. Rep. of Germany . |

Primary Examiner—Charles A. Marmor
Assistant Examiner—Tamara L. Finlay
Attorney, Agent, or Firm—Evenson, Wands, Edwards, Lenahan & McKeown

[57] ABSTRACT

A safety device in the form of an airbag for motor vehicles is disclosed wherein, from a specified vehicle deceleration onwards, the airbag is located inflated in front of a vehicle occupant. The airbag has outlet openings in its cover which permit the gas volume to be partially forced out, the airbag resting with a support surface against a curved windscreen surface and having on its opposite side an impact surface for the vehicle occupant when inflated. The impact surface is approximately aligned in the vehicle transverse direction. The outlet openings have an enlarged opening cross-section for the emergence of gas near to a greatest curvature region of the windscreen surface in relation to a vehicle transverse axis. As a result of this enlarged opening cross-section, the airbag is purposefully more strongly compressed in this region on being impacted by a vehicle occupant.

10 Claims, 1 Drawing Sheet

SAFETY DEVICE IN THE FORM OF AN AIRBAG FOR MOTOR VEHICLES

BACKGROUND AND SUMMARY OF THE INVENTION

The invention relates to a safety device in the form of an airbag for motor vehicle occupants comprising an airbag which is located inflated in front of a vehicle occupant in response to a specified vehicle deceleration, and said airbag having outlet openings in its cover which permit the gas volume to be partially forced out, the airbag resting with a support surface against a vehicle curved windshield surface and having on an opposite side an impact surface for the vehicle occupant when inflated, said impact surface being approximately aligned in the vehicle transverse direction.

German Unexamined Published Application 3,505,927 discloses an airbag for the front passenger of motor vehicles, said airbag being inflated in front of the front passenger and intercepting with its impact surface the upper part of the body of a vehicle occupant thrown forwards in response to a specified vehicle deceleration. For this purpose, the airbag should be able to rest as far as possible with a support surface arranged on the opposite side against a windshield surface and to be supported there. In this respect, it is to be noted that a usual symmetrically constructed airbag with straight edges can be repelled, on the impact of the vehicle occupant, from a curved windscreen surface, as occurs markedly in particular in side regions of the motor vehicle near to the front support pillar. This results in a swivelling moment around a vertical axis being induced in the airbag, the airbag then swivelling out an impact surface, for the vehicle occupant out of a favorable position and throwing the vehicle occupant back in more unfavorable direction. In order to prevent this effect from occurring, the airbag described in the above-noted DOS 3,505,927 is of asymmetrical construction and matched to the shape of the windshield. This means a high production outlay for the airbag, the application possibilities of which has to be separately tested for each vehicle type, since a changed windshield curvature can to a large extent also make it necessary to change the shape of the airbag. This change must then have also already occurred if only the vertical position of a receiving container for mounting the airbag cover, e.g., a front passenger airbag in a dashboard panel, is changed, since then also the shape of the airbag cover already deviates from that of the windshield and the advantages of the matching no longer exist.

In German Published Unexamined Patent Application (DOS) 1,780,304, changeable openings in side parts of an airbag cover are provided, the intention being that an essentially constant pressure in the airbag should be maintained by means of said changeable openings if a vehicle occupant presses on the airbag cover.

An object of the invention is to provide an airbag safety device of the above-noted type which is favorable in terms of economics of manufacture, and which is appropriately matched to a curved windshield surface, so that the impact surface of the airbag is aligned for the vehicle occupant approximately in the vehicle transverse direction.

The object is achieved according to preferred embodiments of the invention by providing airbag venting openings configured to assure matching of the airbag to the curved windshield surface without inducing twisting of the airbag.

By means of the outlet openings asymmetrically arranged over an airbag surface with the outlet openings permitting the greatest emergence of gas in the region of the greatest windscreen curvature, it is achieved that the airbag, on being loaded by a vehicle occupant, can be purposefully more strongly compressed in this region and thus rests against the screen curvature, as a result of which the desired alignment of the impact surface for the vehicle occupant on the opposite side of the airbag in the vehicle transverse direction can be maintained.

This arrangement of the present invention has the result that the airbag can be produced in a uniform shape, which can be matched without a great degree of outlay to differently curved windscreen sections by means of a corresponding variation of the opening cross-sections of the outlet openings.

By means of the deliberate arrangement of outlet openings in side parts or on an airbag surface facing away from the vehicle occupant, the gas flowing out of the gas generator is prevented from being directed towards the vehicle occupant.

Other objects, advantages and novel features of the present invention will become apparent from the following detailed description of the invention when considered in conjunction with the accompanying drawings.

DETAILED DESCRIPTION OF THE DRAWINGS

Figure 1:
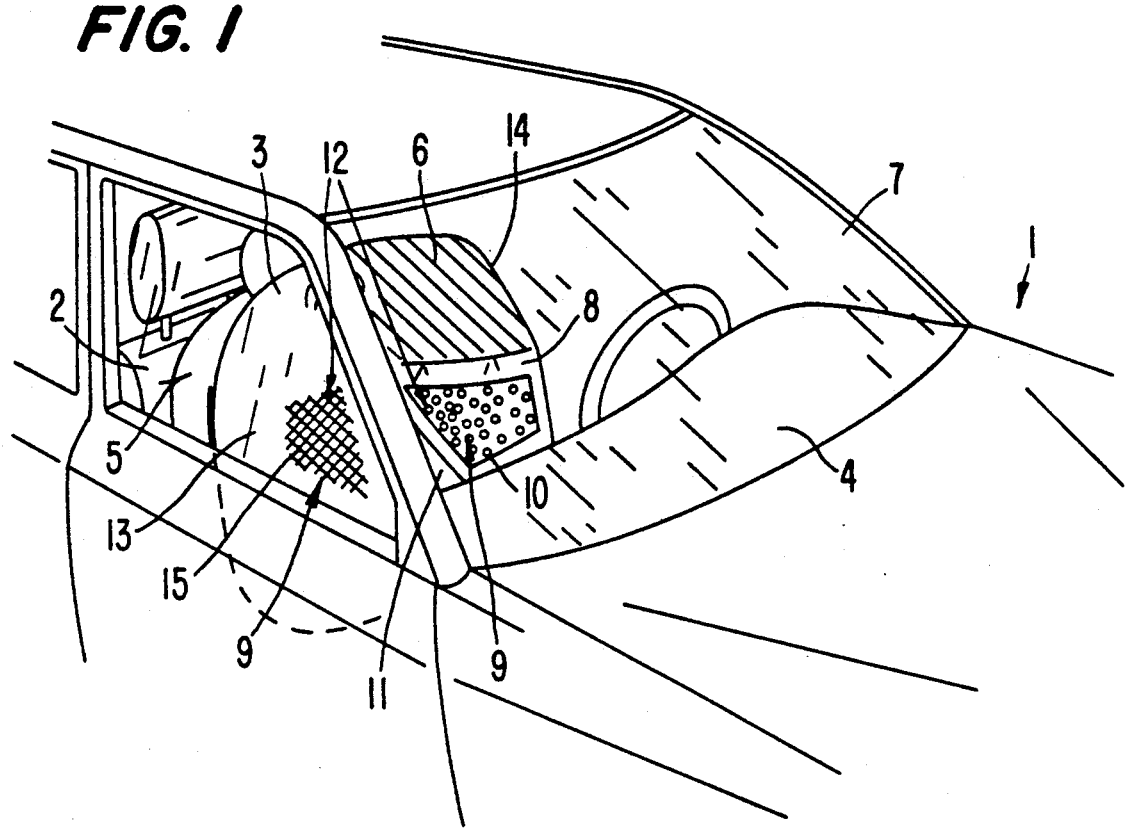
FIG. 1 is a schematic view which shows an airbag inflated between a dashboard and a front passenger in a motor vehicle, constructed in accordance with a preferred embodiment of the invention.

FIG. 1 shows a front region of a motor vehicle 1, in which by way of example an inflated airbag 3 in front of a front passenger seat 2 is illustrated. Airbag 3 is arranged between a dashboard 4 and a front passenger 5 and protects the front passenger 5 from impacting against the dashboard 4. The airbag 3 lies with a support surface 6 against a windshield 7 and has below this support surface 6 an airbag cover region 8, in which outlet openings 9 in the form of a plurality of circular outlets 10 are constructed, which outlets permit the emergence of the gas to the outside after a specified airbag internal pressure has been reached.

The number of these outlet openings 9 is increased in a lateral region of the motor vehicle 1, in which, in contrast to a central section of the windshield 7, a windshield surface 11 which is most highly curved in relation to a vehicle axis is constructed, so that in total an enlarged opening cross-section 12 for the emergence of gas arises.

Likewise, it is alternatively or also additionally contemplated to arrange these outlet openings in side parts 13 and 14 of the airbag 3, which again form an enlarged opening cross-section 12 near to the greatest curvature of the windshield surface 11, thus in the front section of a side part 13, 14. The outlet openings 9 in the side parts 13 and 14 are contained in a filter fabric insert 15 or are replaced by the latter, which on the one hand removes solid particles from the gas emerging from the gas generator (not represented) for filling the airbag 3, and which, by means of its structure which is less permeable than otherwise customary outlets 10, prevents the gas flowing out of the gas generator from flowing out again laterally from the airbag 3 too quickly.

Figure 2:
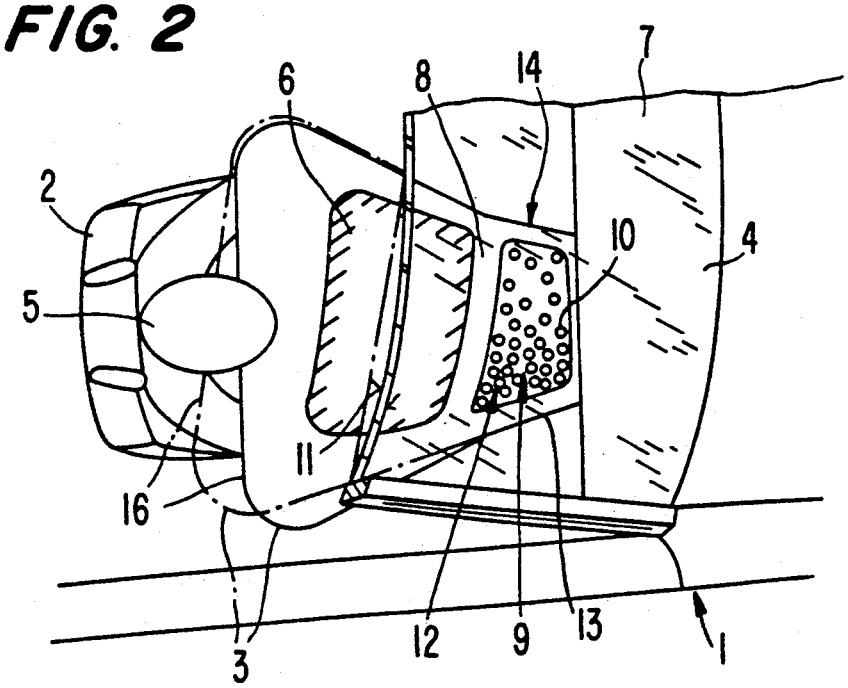
FIG. 2 shows a top view of the arrangement in FIG. 1 with an undesired position of the airbag additionally indicated by dot-dash lines.

The embodiment or arrangement of the outlet openings 9 according to the invention has the effect as illustrated in FIG. 2. A filled airbag 3 with rectilinear support surfaces 6, as represented by dot-dash lines, cannot normally be matched to a highly curved windscreen surface 11. Thus, during impact, the airbag 3 and an impact surface 16 (shown in dash-dot line) would swivel out of alignment upon impact against the highly curved section of the windshield. Upon swivelling out of optimum alignment in the vehicle transverse direction after impacting against the airbag 3, the front passenger would be thrown back towards the center of the vehicle. However, as a result of the configuration of the outlets 10, the pressure of the front passenger against the impact surface 16 against the highly curved windscreen surface 11 is accommodated for by a higher degree of compression of the airbag in this region. As a result, the impact surface 16 is pressed into a proper alignment in the motor vehicle transverse direction. The outlet openings 9 constructed with an enlarged opening cross-section 12 near to the most highly curved windscreen surface 11 thus have the effect that the airbag 3 can be further compressed in this side region of the motor vehicle 1 by the mass of the front passenger 5 and can be matched to the windscreen 7. A further contemplated embodiment of the outlet openings 9 consists in manufacturing the side parts 13 or 14 from fabric with different degrees of permeability to gas, so that the side part 13 permits a greater through-flow of gas near to the most highly curved windscreen surface 11 than the side part 14 lying on the inside.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Safety device for motor vehicle occupants comprising an airbag which is located inflated in front of a vehicle occupant in response to a specified vehicle deceleration, and said airbag having outlet openings in its cover which permit the gas volume to be partially forced out, the airbag resting with a support surface against a vehicle curved windshield surface and having on an opposite side an impact surface for the vehicle occupant when inflated, said impact surface being approximately aligned in the vehicle transverse direction, wherein the airbag region has the greatest overall cross-section of gas outlets per surface unit near to a region with the greatest curvature of the windshield with respect to motor vehicle transverse axis.

2. Safety device according to claim 1, wherein the outlet openings are arranged directed towards the windshield.

3. Safety device according to claim 2, wherein the outlet openings are arranged in a bag cover on side parts of the airbag.

4. Safety device according to claim 3, wherein the outlet openings are formed by a filter fabric insert which is asymmetrically cut to size.

5. Safety device according to claim 1, wherein the outlet openings are arranged in a bag cover on side parts of the airbag.

6. Safety device according to claim 5, wherein the respective opposite side parts of the airbag are formed by two respective bag covering fabrics with two different degrees of gas permeability.

7. Safety device according to claim 1, wherein the outlet openings are contained in a filter fabric insert.

8. A safety airbag arrangement for protecting a motor vehicle occupant in a motor vehicle having a front windshield which exhibits varying curvature in a vehicle transverse direction, comprising:

an inflatable airbag exhibiting a passenger impact surface on its side facing away from the windshield and an airbag support surface engageable with the windshield, wherein airbag vent openings are provided in the airbag for venting the airbag and permitting compression of the airbag after it reaches its maximum inflation position, said airbag vent openings being configured asymmetrically so as to effect a greater compression of the airbag in the area of the windshield's greatest curvature to thereby minimize twisting of the airbag impact surface due to the windshield curvature.

9. An arrangement according to claim 8, wherein said airbag vent openings include openings disposed to face the windshield.

10. An arrangement according to claim 8, wherein said airbag vent openings are at provided inside sections of the airbag.

* * * * *